United States Patent
Jejina (10) Patent No.: US 8,406,387 B2
(45) Date of Patent: Mar. 26, 2013

(54) METHOD FOR THE REMOTE REQUEST OF INFORMATION WHICH IS STORED IN A TELECOMMUNICATION ENTITY AND A TELECOMMUNICATION ENTITY HAVING REMOTE REQUEST FUNCTIONALITY FOR STORED INFORMATION

(75) Inventor: Igor Jejina, München (DE)

(73) Assignee: Gigaset Communications GmbH, Munich (DE)

( * ) Notice: Subject to any disclaimer, the term of this patent is extended or adjusted under 35 U.S.C. 154(b) by 2146 days.

(21) Appl. No.: 10/571,366

(22) PCT Filed: Jul. 6, 2005

(86) PCT No.: PCT/EP2005/053229
§ 371 (c)(1),
(2), (4) Date: Mar. 10, 2006

(87) PCT Pub. No.: WO2006/003211
PCT Pub. Date: Jan. 12, 2006

(65) Prior Publication Data
US 2008/0226045 A1 Sep. 18, 2008

(51) Int. Cl.
*H04M 11/00* (2006.01)
*H04M 1/64* (2006.01)
(52) U.S. Cl. .............. 379/88.13; 379/88.22; 379/93.23
(58) Field of Classification Search .......... None
See application file for complete search history.

(56) References Cited

U.S. PATENT DOCUMENTS

| 5,438,616 | A | * | 8/1995 | Peoples | 379/210.01 |
| 5,666,405 | A | * | 9/1997 | Weber | 379/127.03 |
| 5,689,548 | A | * | 11/1997 | Maupin et al. | 455/404.1 |
| 5,710,809 | A | * | 1/1998 | Mashinsky | 379/220.01 |
| 5,712,900 | A | * | 1/1998 | Maupin et al. | 455/433 |
| 5,966,660 | A | * | 10/1999 | Jonsson | 455/445 |
| 6,005,926 | A | * | 12/1999 | Mashinsky | 379/114.02 |
| 7,809,953 | B2 | * | 10/2010 | Little et al. | 713/184 |
| 2004/0107243 | A1 | * | 6/2004 | Tsyganskiy | 709/203 |

FOREIGN PATENT DOCUMENTS

| DE | 102 35 798 | 3/2004 |
| EP | 0 831 630 | 3/1998 |
| GB | 2 343 536 | 4/2000 |
| WO | WO 95/05046 | 2/1995 |

* cited by examiner

*Primary Examiner* — Joseph T Phan
(74) *Attorney, Agent, or Firm* — Occhiuti Rohlicek & Tsao LLP (57) ABSTRACT

An apparatus and method for the remote request of information stored in telecommunication devices. In operation, an initialization message is transmitted to a telecommunication device, which initiates the remote request of stored information. The initialization message can also be used to notify the telecommunication device of an authorization code authorizing the remote inquiry and dial-in information for providing a transmission address of the requested information. After verifying the authenticating code and evaluating the dial-in information, a telecommunication connection is established to another telecommunication device corresponding to the dial-in information. The stored information is then transmitted to a requester via the telecommunication connection.

22 Claims, 7 Drawing Sheets

METHOD FOR THE REMOTE REQUEST OF INFORMATION WHICH IS STORED IN A TELECOMMUNICATION ENTITY AND A TELECOMMUNICATION ENTITY HAVING REMOTE REQUEST FUNCTIONALITY FOR STORED INFORMATION

FIELD OF TECHNOLOGY

The invention relates generally to the remote request of information which is stored in a telecommunication entity, wherein the telecommunication entity has the remote request functionality for storing the information.

BACKGROUND

Telecommunication entities in which information (e.g., messages of a caller from the fixed network or mobile radio network, so-called caller messages) is stored or can be stored are normally either call answering facilities that are separate or used in conjunction with a telephone on the user side, or T-Net boxes or mobile Voice Mail boxes that are rented from the network operator. These entities normally include a remote request functionality for requesting the stored information or messages from a remote telecommunication device. In earlier call answering facilities assigned to the fixed network, specially designed manual transmitters were used for this purpose in order to implement the remote request functionality as described in WO 95/05046.

However, as a result of the increasing construction of mobile radio networks, the associated widespread use of mobile radio telephones or so-called mobile phones, and the introduction of cordless telephones that operate with the fixed network, two developments leading to a modified remote request scenario have emerged in relation to the remote request of stored information or messages. Firstly, in particular in the field of mobile radio, the use of information or message storage facilities or so-called boxes (T-Net box in the fixed network and mobile Voice Mail box in the mobile radio network), which are managed by the network operator and can be rented by the user. Secondly, the trend away from the manual transmitters to remote request of information or messages stored in one of the aforementioned telecommunication entities. How this modified remote request scenario, which must also ascribed to the prior art, appears in relation to the fixed network and the mobile radio network, as well as how in principle the information/messages can be remotely requested, are illustrated with reference to message flow diagrams in FIGS. 1 and 2.

Figure 1:
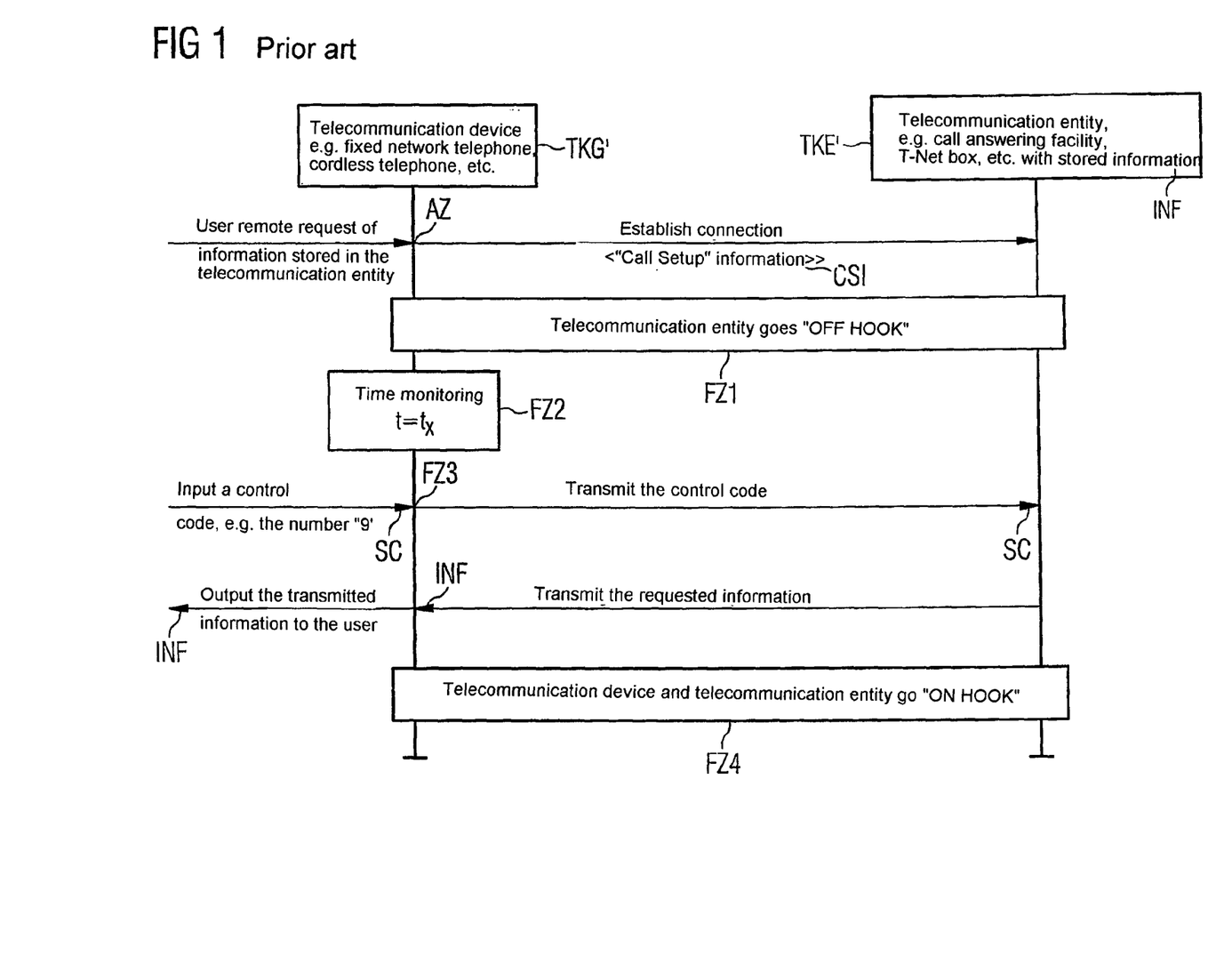
FIG. 1 illustrates a remote request of information stored in a telecommunication entity with reference to the fixed network.

More specifically, FIG. 1 illustrates the sequence, within a fixed network, of a remote request of information that is stored in a telecommunication entity TKE'. The entity TKE' can have the form of a call answering facility or T-Net box. The information is stored by the user of a telecommunication device TKG, which can be designed, e.g., as a fixed network telephone or cordless telephone, in accordance with the prior art. In an initial state AZ, the remote request of information INF, which is stored in the telecommunication entity TKE', is started in the telecommunication device TKG' by the user of the telecommunication device TKG' as a requester. To this end, the telecommunication device TKG' goes "OFF HOOK." The information INF which is stored in the telecommunication entity TKE' is, for example, a message of a caller who has attempted in vain to contact the fixed network subscriber corresponding to the telecommunication entity TKE'. The information INF can also contain any type of text, audio, and/or video information in general.

As a result of the start of the user remote request, i.e., in the "OFF HOOK" state of the telecommunication device TKG', the telecommunication device TKG' establishes a connection to the telecommunication entity TKE' and transmits "Call Setup" information CSI to the telecommunication entity TKE'. As a result of transmitting the "Call Setup" information CSI, the telecommunication entity TKE' likewise goes "OFF HOOK" in a first subsequent state FZ1, whereby the telecommunication device TKG' and the telecommunication entity TKE' are connected together. After this, a time $t=t_x$ is monitored by the telecommunication device TKG' in a second subsequent state FZ2. During this time $t=t_x$, the user of the telecommunication device TKG' has the possibility of using the connection which has been established to the telecommunication entity TKE'. If the established connection is not used by the user of the telecommunication device TKG' within this time $t=t_x$, the connection to the telecommunication entity TKE' is cleared down.

In a third subsequent state FZ3, i.e., within the monitored time $t=t_x$, a control code SC for the remote request is entered by the user of the telecommunication device TKG'. This control code SC is the number "9" in the case of the known Siemens cordless telephones of the "GIGASET" brand. The number can be entered via the telephone keypad. Following the input of the control code SC, this is transmitted from the telecommunication device TKG' to the telecommunication entity TKE' via the established connection. The request of the information INF that is stored in the telecommunication entity TKE' is controlled by means of the transmission of the control code SC.

After the telecommunication entity TKE' has received and checked the control code SC, the telecommunication entity TKE' transmits the requested information INF via the established connection to the telecommunication device TKG'. The transmitted information INF is output for the user in the telecommunication device TKG'. In this case, the output of the information INF can be acoustic and/or visual. However, the output will preferably correspond to the form in which the stored information INF is present in the telecommunication entity TKE'. If the stored information INF is a caller message, for example, this will be output acoustically by way of playback. After the information INF has been output to the user, both the telecommunication device TKG' and the telecommunication entity TKE' go "ON HOOK" in a fourth subsequent state FZ4, whereby the connection between the telecommunication device TKG' and the telecommunication entity TKE' is cleared down again.

Figure 2:
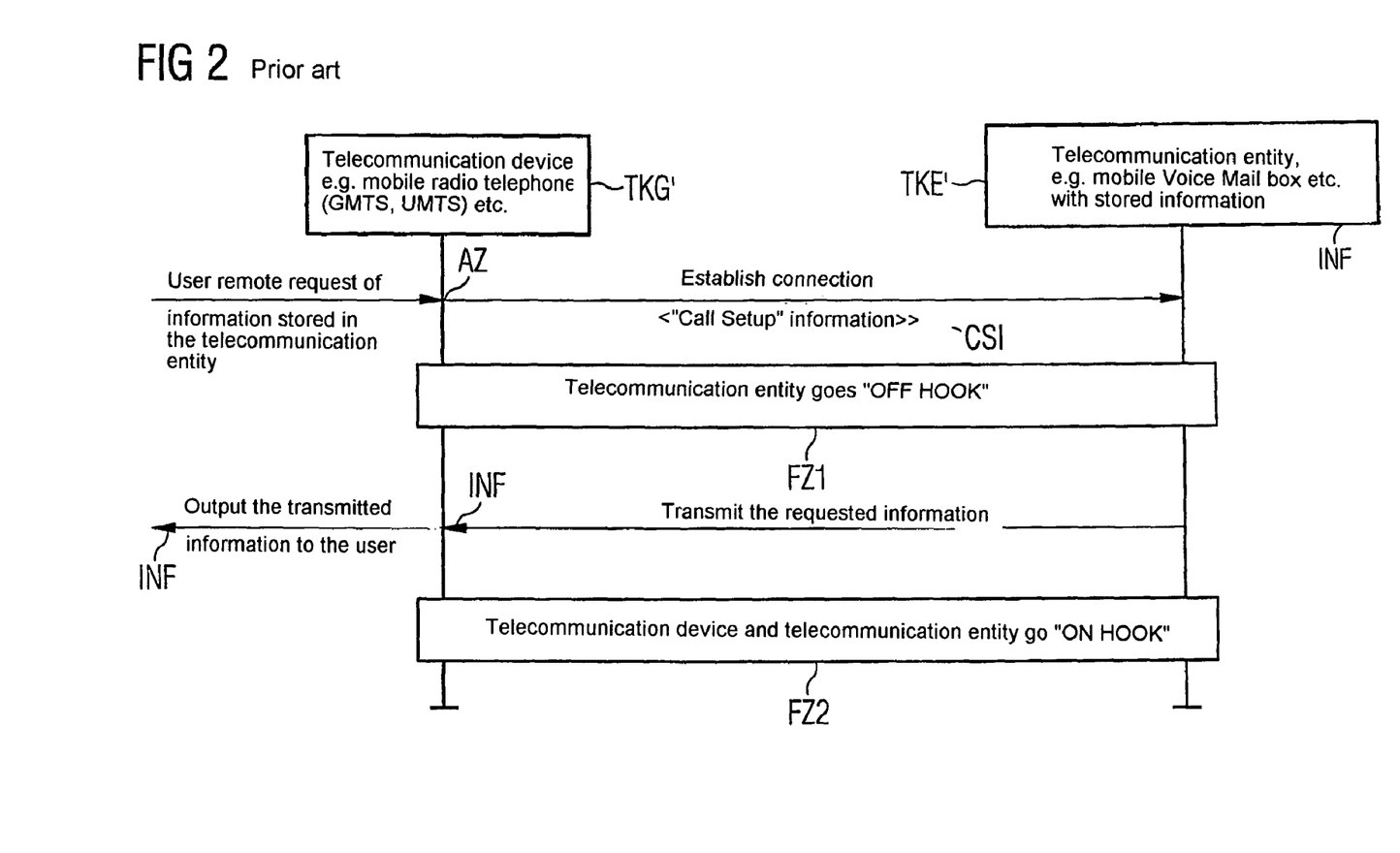
FIG. 2 illustrates a remote request of information stored in a telecommunication entity with reference to a mobile radio network.

FIG. 2 illustrates the sequence, within a mobile radio network, of a remote request of information which is stored in a telecommunication entity TKE'. The entity TKE' can have the form of a mobile Voice Mail box. The information is stored by the user of a telecommunication device TKG', which can be designed, e.g., as a mobile radio telephone as per the GSM or UMTS standard, in accordance with the prior art. In an initial state AZ, the remote request of information INF, which is stored in the telecommunication entity TKE', is started in the telecommunication device TKG' by the user of the telecommunication device TKG' as a requester. To this end, the telecommunication device TKG' goes "OFF HOOK" The information INF which is stored in the telecommunication entity TKE' is, for example, a message of a caller who has attempted in vain to contact the mobile radio network subscriber corresponding to the telecommunication entity TKE'. The information INF can also contain any type of text, audio, and/or video information in general.

As a result of the start of the user remote request (i.e. in the "OFF HOOK" state of the telecommunication device TKG')

the telecommunication device TKG' establishes a connection to the telecommunication entity TKE' and transmits "Call Setup" information CSI to the telecommunication entity TKE'. As a result of transmitting the "Call Setup" information CSI, the telecommunication entity TKE' likewise goes "OFF HOOK" in a first subsequent state FZ1, whereby the telecommunication device TKG' and the telecommunication entity TKE' are connected together.

After this, the telecommunication entity TKE' transmits the requested information INF via the established connection to the telecommunication device TKG'. The transmitted information INF is output for the user in the telecommunication device TKG'. In this case, the output of the information INF can be acoustic and/or visual. However, the output will preferably correspond to the form in which the stored information INF is present in the telecommunication entity TKE'. If the stored information INF is a caller message, for example, this will be output acoustically by means of playback. After the information INF has been output to the user, both the telecommunication device TKG' and the telecommunication entity TKE' go "ON HOOK" in a second subsequent state FZ2, whereby the connection between the telecommunication device TKG' and the telecommunication entity TKE' is cleared down again.

The invention addresses the problem of simplifying the remote request of information which is stored in a telecommunication entity from the perspective of the requester, improving the ease of use of the remote request, and if necessary reducing the costs of the remote request.

SUMMARY

An object of the invention is to provide for a telecommunication entity to be sent an initialization message, which initiates a remote request. The entity, for example, can be a call answering facility, a T-Net box or a mobile Voice Mail box, which store information for remote requests. The message can be configured as a short message as per the "Short Message Service," a multimedia message as per the "multimedia Message Service," or quite simply as a telephone message. The entity can be notified of an authentication code that authorizes the remote request and dial-in information that serves as a transfer address for transferring the stored information. After checking the authentication code and evaluating the dial-in information, the entity establishes a telecommunication connection to a telecommunication device corresponding to the dial-in information. The telecommunication device can be designed as a fixed network telephone, a cordless telephone or a mobile radio telephone. The entity then transfers the information to the remote requester via the telecommunication connection.

It is another object of the invention to provide provisions for both text, audio and/or video information, which can originate from any electrical/electronic devices that are connected to the telecommunication entity, e.g., for the purpose of remote monitoring, as well as caller messages to be stored as information in the telecommunication entity. In particular, as a result of sending of a short message or multimedia message to the call answering facility or mailbox, the call answering facility, T-Net box or mailbox independently (automatically) initiates a callback. The telephone number that is required for the callback (i.e., the dial-in information) is either the telephone number of the originator of the short message or multimedia message, wherein said telephone number is automatically contained in the relevant message (i.e., direct transfer of the dial-in information or telephone number), or a number which is different to that of the originator of the short message or multimedia message (i.e., in which case it must be entered manually). Alternatively, it is also possible for the dial-in information or the telephone number of the originator to be transferred as CLIP information (Calling Line Identification Presentation), i.e., indirectly.

For security and authentication purposes, an authentication code is entered or inserted into the corresponding message by the originator of the short message or multimedia message, wherein the authentication code can be designed as a secret code or individual code. This code, for example, has a code part which is specific to a telecommunication entity. If a cordless telephone including an integrated call answering facility is used as a telecommunication entity, for example, the system PIN (Personal Identification Number) can be used as a code part which is specific to the telecommunication entity. If both the authentication code and the dial-in information are transmitted in the initialization message, the secret code or individual code containing (e.g., the system PIN as a code part specific to the telecommunication entity) should clearly differ from a telephone number otherwise the callback could possibly be initiated to a wrong subscriber.

In such a case of an incorrectly addressed callback and in order to prevent the information from being transmitted to a wrong addressee, and/or in the event that the telecommunication device (which automatically inserts the authentication code and the dial-in information) is used for a remote request by someone other than the authorized user, it is advantageous for reasons of security if the code part (which is specific to a telecommunication entity) is transmitted from the telecommunication device via the established telecommunication connection before the stored remotely requested information is transferred by the telecommunication entity.

The previously known solutions (e.g., FIGS. 1 and 2) for remotely requesting stored information have the following disadvantages compared with the proposed solution according to the invention as will be illustrated in more detail in FIGS. 3A, 3B, 4A, 4B and 5:

(i) If the telecommunication entity takes the form of a call answering facility, the requester must remember the control code for activation of the call answering facility;

(ii) The mailbox request only functions in the case of a mobile radio telephone (mobile phone) having a corresponding SIM card; and (iii) The charges must always be borne by the requester. Depending on the situation, however, it can be clearly more economical if the charges accumulate at the site of the call answering facility.

In an example scenario, a requester is staying in a hotel in another country (temporary accommodation). While in the hotel, for example, he or she sends an "SM" (Short Message) from his or her mobile radio telephone (mobile phone), including the hotel call number which has been assigned to him or her for the hotel accommodation, to the call answering facility or the mobile Voice Mail box. In accordance with the hotel call number which was sent, the call answering facility or the mobile Voice Mail box establishes, e.g., a telecommunication connection to the fixed network connection interface of the hotel and transmits the remotely requested information via this connection.

Instead of an expensive mobile radio call from another country or an international call from the hotel including hotel charges, the invention ensures that charges are only incurred for the SMS service and for the fixed network connection interface to the other country. The proposed solution represents an attractive scenario for telephone companies in particular. Since in particular current fixed network telephones already offer the possibility of SMS notification in the case of a missed call or in the case of new messages on the call answering facility, the "Request to call answering facility via SMS (Short Message Service)" function beneficially extends the range of services offered by these telephones, and by all telecommunication entities or telecommunication devices in general, from a user perspective.

BRIEF DESCRIPTION OF THE FIGURES

The various objects, advantages and novel features of the present disclosure will be more readily apprehended from the following Detailed Description when read in conjunction with the enclosed drawings, in which.

DETAILED DESCRIPTION

Figure 3A:
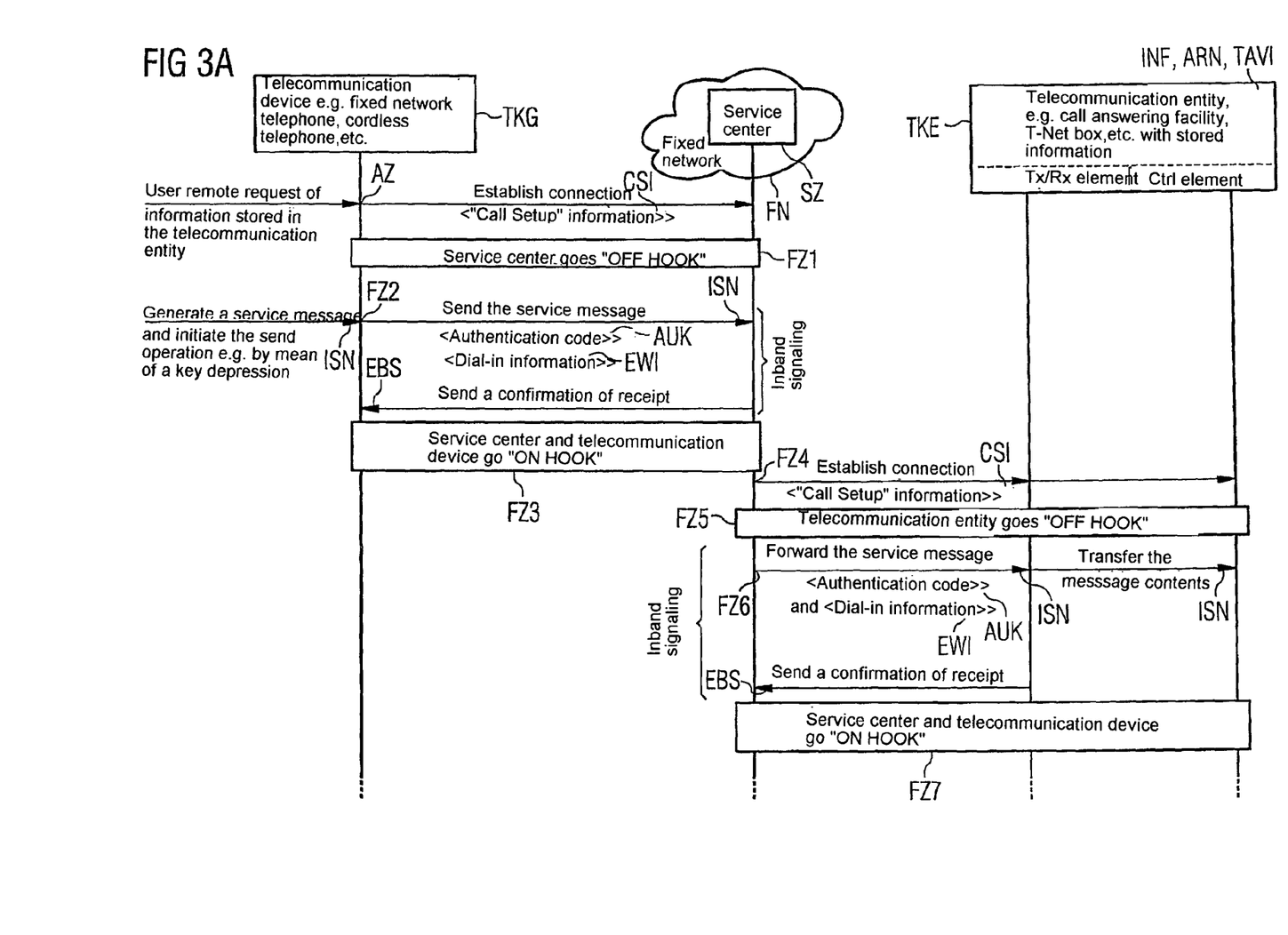
FIGS. 3A and 3B illustrate a remote request of information stored in a telecommunication entity with reference to a fixed network in accordance with an embodiment of the invention.
Figure 3B:
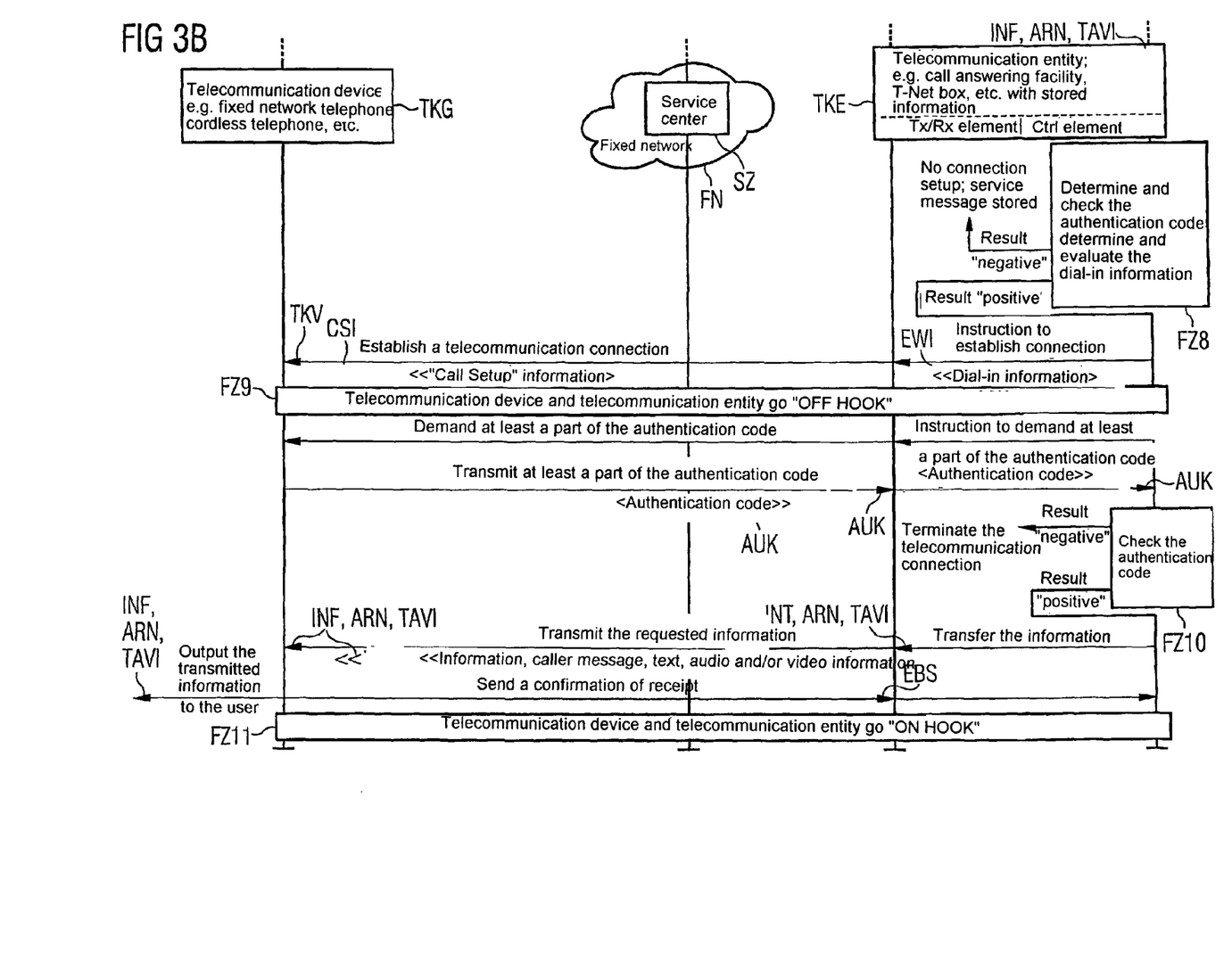

FIGS. 3A and 3B illustrate the modified sequence, within a fixed network, of a remote request of information which is stored in a telecommunication entity TKE. Similar to FIG. 1, the entity TKE can have the form of a call answering facility or T-Net box. The information is stored by the user of a telecommunication device TKG, which can be designed, e.g., as a fixed network telephone or cordless telephone. The telecommunication entity TKE features a Tx/Rx element and a Ctrl element, whose function with regard to the remote request is explained in the further description of the remote request sequence and particularly in the description of FIG. 5.

In an initial state AZ, the remote request of information INF, which is stored in the telecommunication entity TKE, is started in the telecommunication device TKG by the user of the telecommunication device TKG as a requester. To this end, the telecommunication device TKG goes "OFF HOOK." The information INF which is stored in the telecommunication entity TKE can be, for example, a message ARN of a caller who has attempted in vain to contact the fixed network subscriber corresponding to the telecommunication entity TKE. The information INF can also contain any type of text, audio, and/or video information TAVI in general. As a result of the start of the user remote request (i.e., in the "OFF HOOK" state of the telecommunication device TKG) the telecommunication device TKG establishes a connection to a service center SZ, which is assigned to the fixed network FN and transmits "Call Setup" information CSI to the service center SZ. As a result of transmitting the "Call Setup" information CSI, the service center SZ likewise goes "OFF HOOK" in a first subsequent state FZ1, whereby the telecommunication device TKG' and the service center SZ are connected together.

In a second subsequent state FZ2 following thereupon, a service message ISN having the form of an initialization message is entered by the user of the telecommunication device TKG in order to initialize the remote request of the information INF, ARN, TAVI, which is stored in the telecommunication entity TKE. This initialization message or service message ISN is preferably entered via a keypad of the telecommunication device TKG, which keypad is not illustrated. The initialization message or service message ISN can preferably be a short message in accordance with the "Short Message Service (SMS)" or a multimedia message in accordance with the "Multimedia Message Service (MMS)." After the input of the initialization message or service message ISN, and initiated (e.g., by way of a key depression on the telecommunication device TKG) the initialization message or service message ISN that is specified for the telecommunication entity TKE is transmitted from the telecommunication device TKG to the service center SZ via the established connection in a manner, which is known.

In addition to the transmitted initialization message or service message ISN, however, an authentication code AUK for authorizing the remote request and a dial-in information EWI for the transmission of the stored information INF, TAVI, ARN are also sent to the service center SZ. In reply to the transmitted initialization message or service message ISN with the authentication code AUK and the dial-in information EWI, the service center SZ sends a confirmation of receipt EBS. The initialization message or service message ISN with the authentication code AUK and the dial-in information EWI are transmitted as part of an inband signaling. The authentication code AUK is, e.g., an individual code which is clearly distinguishable from a telephone number, wherein said individual code preferably includes a code part which is specific to a telecommunication entity.

As mentioned above, the dial-in information EWI is used as a transfer address and can be transferred either directly with the initialization message or service message ISN if it is inherently included in the initialization message or service message ISN, or indirectly as CLIP information with the initialization message or service message ISN. After this transmission, both the telecommunication device TKG and the service center SZ go "ON HOOK" in a third subsequent state FZ3, whereby the connection between the telecommunication device TKG and the service center SZ is cleared down again.

In order to forward the initialization message or service message ISN, which is received with the authentication code AUK and the dial-in information EWI from the telecommunication device TKG to the telecommunication entity TKE, the service center goes "OFF HOOK" in a fourth subsequent state FZ4. In this "OFF HOOK" state, the service center SZ establishes a connection to the telecommunication entity TKE and transmits "Call Setup" information CSI to the telecommunication entity TKE. As a result of the transmission of the "Call Setup" information CSI, the telecommunication entity TKE including the Tx/Rx element and the Ctrl element likewise goes "OFF HOOK" in a fifth subsequent state FZ5, whereby the service center SZ and the telecommunication entity TKE including the Tx/Rx element and the Ctrl element are connected together.

In a sixth subsequent state FZ6, the service center SZ then routes the initialization message or service message ISN with the authentication code AUK and the dial-in information EWI to the Tx/Rx element of the telecommunication entity TKE, which forwards the content of the initialization message or service message ISN to the Ctrl element of the telecommunication entity TKE. In reply to the transmitted initialization message or service message ISN with the authentication code AUK and the dial-in information EWI, the telecommunication entity TKE sends a confirmation of receipt EBS to the service center SZ. The forwarding of the initialization message or service message ISN with the authentication code AUK and the dial-in information EWI, as well as the transmission of the confirmation of receipt EBS, again takes place as part of an inband signaling. After this forwarding or transmission, both the service center SZ and the telecommunication entity TKE including the Tx/Rx element and the Ctrl element go "ON HOOK" in a seventh subsequent state FZ7, whereby the connection between the service center SZ and the telecommunication entity TKE including the Tx/Rx element and the Ctrl element is cleared down again.

In an eighth subsequent state FZ8 following thereupon, the authentication code AUK is determined and checked and the dial-in information EWI is determined and evaluated by the Ctrl element of the telecommunication entity TKE. The authentication code AUK and dial-in information EWI can be transferred in the initialization message or service message ISN from the service center SZ. If the check or evaluation has a positive result (e.g., the determined authentication code AUK is correct and/or the determined and evaluated dial-in information EWI is accepted on the basis of a default or user-specific parameter or setting) the Ctrl element of the telecommunication entity TKE instructs the Tx/Rx element to establish a connection to the telecommunication device TKG, which corresponds to the dial-in information EWI and transfers the dial-in information EWI to the Tx/Rx element for this purpose.

However, if the check or evaluation has a negative result (e.g. the determined authentication code AUK is incorrect and/or the determined and evaluated dial-in information EWI is not accepted on the basis of a default or user-specific parameter or setting) no connection setup takes place and the relevant initialization message or service message ISN is stored. As a result of the instruction from the Ctrl element to the Tx/Rx element of the telecommunication entity TKE to establish the connection, the telecommunication entity TKE goes "OFF HOOK." In this "OFF HOOK" state, the telecommunication entity TKE establishes a telecommunication connection TKV to the telecommunication device TKG and transmits "Call Setup" information CSI to the telecommunication device TKG in this case. As a result of the transmission of the "Call Setup" information CSI, the telecommunication device TKG also goes "OFF HOOK", such that the telecommunication entity TKE and the telecommunication device TKG are "OFF HOOK" and connected to each other in a ninth subsequent state FZ9.

In this state, after the Tx/Rx element of the telecommunication entity TKE has been instructed by the Ctrl element of the telecommunication entity TKE to demand at least a part of the authentication code AUK from the telecommunication device TKG (e.g., the code part which is specific to the telecommunication entity) the Tx/Rx element of the telecommunication entity TKE demands this part of the authentication code AUK from the telecommunication device TKG. In return, the Tx/Rx element of the telecommunication entity TKE receives the demanded part of the authentication code AUK from the telecommunication device TKG and passes the received authentication code AUK to the Ctrl element of the telecommunication entity TKE.

In a tenth subsequent state FZ10 following thereupon, the part or complete authentication code AUK that was transferred from the telecommunication device TKG is checked by the Ctrl element of the telecommunication entity TKE. If the check has a positive result (e.g., the transferred authentication code AUK is correct and matches, for example, an authentication code that is stored in the telecommunication entity TKE) the Ctrl element of the telecommunication entity TKE passes the demanded information INF, ARN, TAVI to the Tx/Rx element, which in turn transmits the demanded information INF, ARN, TAVI to the telecommunication device TKG. However, if the check has a negative result (e.g., the transferred authentication code AUK is incorrect and does not match, for example, an authentication code that is stored in the telecommunication entity TKE) the telecommunication connection TKV is terminated.

Following receipt of the demanded information INF, ARN, TAVI by the telecommunication device TKG, the transmitted information INF is output for the user and, in reply to the received information INF, ARN, TAVI, a confirmation of receipt EBS is sent to the Tx/Rx element and Ctrl element of the telecommunication entity TKE. The output of the information INF, ARN, TAVI can again be acoustic and/or visual. However, the output will preferably correspond to the form in which the stored information INF, ARN, TAVI is present in the telecommunication entity TKE. If the stored information INF, ARN, TAVI is a caller message ARN or any audio information in general, this will be output acoustically by means of playback. Whereas if the information INF, ARN, TAVI is text or video information, it will preferably be output by visual means on a display of the telecommunication device TKG. After the information INF, ARN, TAVI has been output to the user, both the telecommunication device TKG and the telecommunication entity TKE go "ON HOOK" in an eleventh subsequent state FZ11. In this case, the telecommunication connection TKV between the telecommunication device TKG and the telecommunication entity TKE is cleared down again.

Figure 4A:
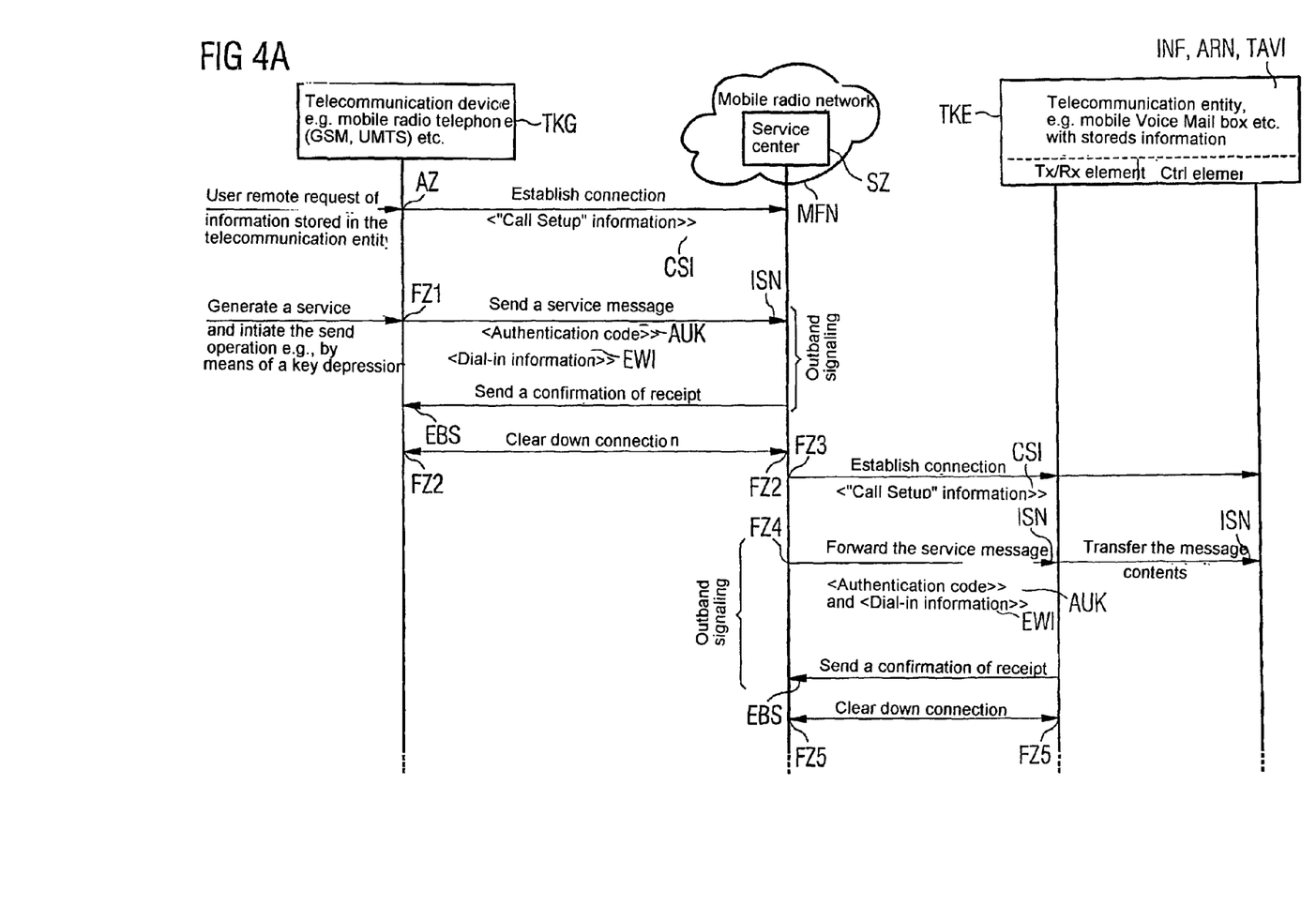
FIGS. 4A and 4B illustrate a remote request of information stored in a telecommunication entity with reference to a mobile radio network in accordance with an embodiment of the invention.
Figure 4B:
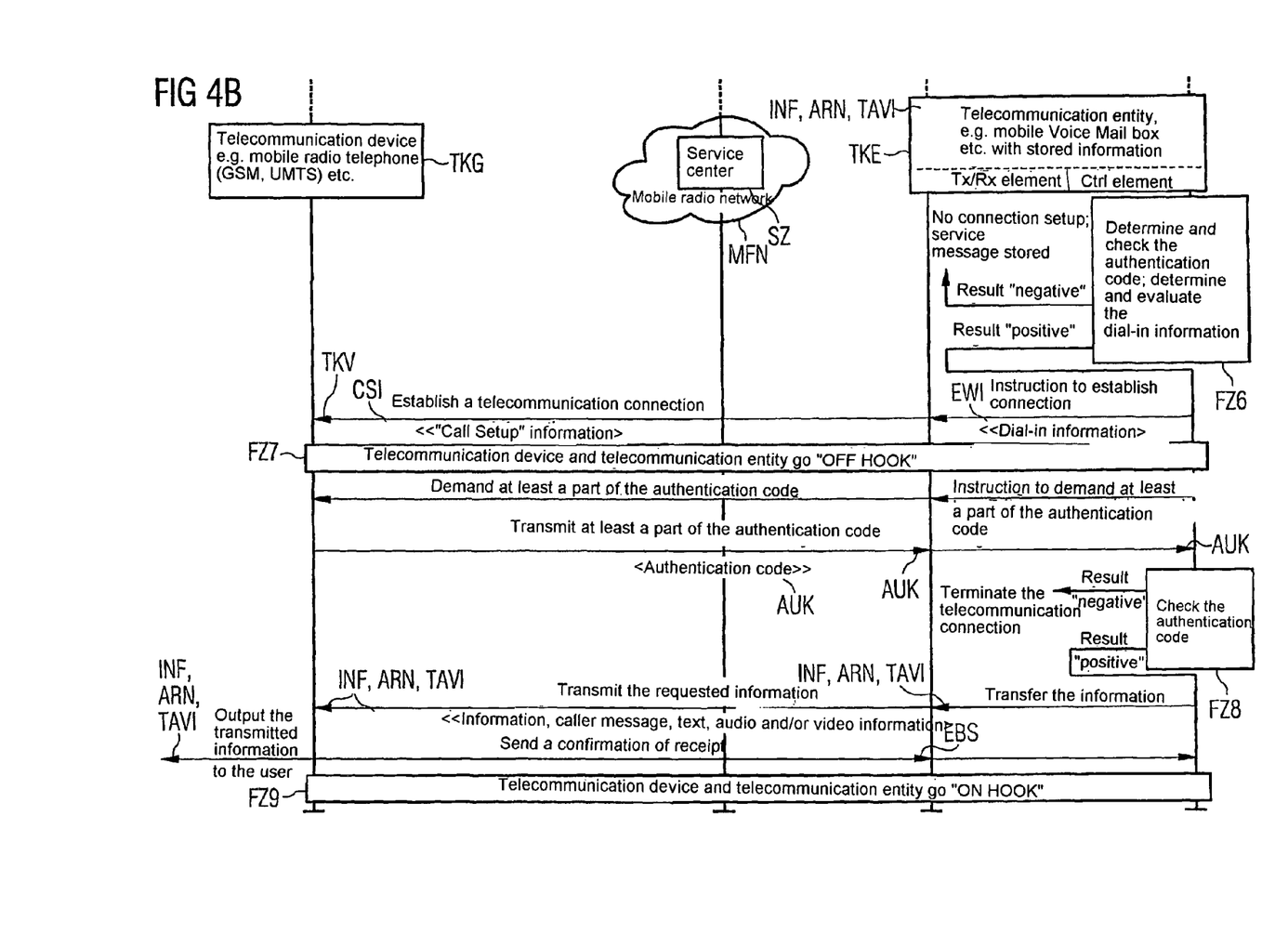

FIGS. 4A and 4B illustrate the modified sequence, within a mobile radio network, of a remote request of information which is stored in a telecommunication entity TKE. Similar to FIG. 2, the entity TKE can have the form of a mobile Voice Mail box. The information is stored by the user of a telecommunication device TKG, which again can be designed, e.g., as a mobile radio telephone in accordance with the GSM or UMTS standard. The telecommunication entity TKE features a Tx/Rx element and a Ctrl element, whose function with regard to the remote request is explained in the further description of the remote request sequence and particularly in the description of FIG. 5.

In an initial state AZ, the remote request of information INF, which is stored in the telecommunication entity TKE, is again started in the telecommunication device TKG by the user of the telecommunication device TKG as a requester. The information INF that is stored in the telecommunication entity TKE is, for example, a message ARN of a caller who has attempted in vain to contact the mobile radio network subscriber corresponding to the telecommunication entity TKE. The information INF can also contain any type of text, audio, and/or video information TAVI in general. As a result of the start of the user remote request, the telecommunication device TKG establishes a connection to a service center SZ, which is assigned to the mobile radio network MFN and transmits "Call Setup" information CSI to the service center SZ in this case.

In a first subsequent state FZ1 following thereupon, a service message ISN having the form of an initialization message is entered by the user of the telecommunication device TKG in order to initialize the remote request of the information INF, ARN, TAVI, which is stored in the telecommunication entity TKE. This initialization message or service message ISN can be entered via a keypad of the telecommunication device TKG, which keypad is not illustrated. The initialization message or service message ISN can preferably be a short message in accordance with the "Short Message Service (SMS)" or a multimedia message in accordance with the "Multimedia Message Service (MMS)."

After the input of the initialization message or service message ISN, and initiated (e.g., by means of a key depression on the telecommunication device TKG) the initialization message or service message ISN that is specified for the telecommunication entity TICE is transmitted from the telecommunication device TKG to the service center SZ via the established connection in a manner which is known. In addition to the transmitted initialization message or service message ISN, however, an authentication code AUK for authorizing the remote request and a dial-in information EWI for the transmission of the stored information INF, TAVI, ARN are also sent to the service center SZ. In reply to the transmitted initialization message or service message ISN with the authentication code AUK and the dial-in information EWI, the service center SZ sends a confirmation of receipt EBS. The initialization message or service message ISN with the authentication code AUK and the dial-in information EWI are transmitted as part of an outband signaling.

The authentication code AUK is (e.g., an individual code which is clearly distinguishable from a telephone number) wherein said individual code can include a code part which is specific to a telecommunication entity. As mentioned above, the dial-in information EWI is used as a transfer address and can be transferred either directly with the initialization message or service message ISN if it is inherently included in the initialization message or service message ISN, or indirectly as CLIP information with the initialization message or service message ISN. After this transmission, in a second subsequent state FZ2, the connection between the telecommunication device TKG and the service center SZ is cleared down again. In order to forward the initialization message or service message ISN, which is received with the authentication code AUK and the dial-in information EWI from the telecommunication device TKG to the telecommunication entity TKE, the service center SZ establishes a connection to the telecommunication entity TKE in a third subsequent state FZ3 and transmits "Call Setup" information CSI to the telecommunication entity TKE, including the Tx/Rx element and the Ctrl element.

In a fourth subsequent state FZ4, the service center SZ then routes the initialization message or service message ISN with the authentication code AUK and the dial-in information EWI to the Tx/Rx element of the telecommunication entity TKE, which forwards the content of the initialization message or service message ISN to the Ctrl element of the telecommunication entity TKE. In reply to the transmitted initialization message or service message ISN with the authentication code AUK and the dial-in information EWI, the telecommunication entity TKE sends a confirmation of receipt EBS to the service center SZ. The forwarding of the initialization message or service message ISN with the authentication code AUK and the dial-in information EWI as well as the transmission of the confirmation of receipt EBS, again takes place as part of an outband signaling.

After this forwarding or transmission, in a fifth subsequent state FZ5, the connection between the service center SZ and the telecommunication entity TKE including the Tx/Rx element and the Ctrl element is cleared down again. In a sixth subsequent state FZ6 following thereupon, the authentication code AUK is determined and checked and the dial-in information EWI is determined and evaluated by the Ctrl element of the telecommunication entity TKE. The authentication code AUK and dial-in information EWI can be transferred in the initialization message or service message ISN from the service center SZ. If the check or evaluation has a positive result (e.g., the determined authentication code AUK is correct and/or the determined and evaluated dial-in information EWI is accepted on the basis of a default or user-specific parameter or setting) the Ctrl element of the telecommunication entity TKE instructs the Tx/Rx element to establish a connection to the telecommunication device TKG that corresponds to the dial-in information EWI and transfers the dial-in information EWI to the Tx/Rx element for this purpose.

However, if the check or evaluation has a negative result (e.g., the determined authentication code AUK is incorrect and/or the determined and evaluated dial-in information EWI is not accepted on the basis of a default or user-specific parameter or setting) no connection setup takes place and the relevant initialization message or service message ISN is stored. As a result of the instruction from the Ctrl element to the Tx/Rx element of the telecommunication entity TKE to establish the connection, the telecommunication entity TKE goes "OFF HOOK." In this "OFF HOOK" state, the telecommunication entity TKE establishes a telecommunication connection TKV to the telecommunication device TKG and transmits "Call Setup" information CSI to the telecommunication device TKG in this case. As a result of the transmission of the "Call Setup" information CSI, the telecommunication device TKG also goes "OFF HOOK," such that the telecommunication entity TKE and the telecommunication device TKG are "OFF HOOK" and connected to each other in a seventh subsequent state FZ7.

In this state, after the Tx/Rx element of the telecommunication entity TKE has been instructed by the Ctrl element of the telecommunication entity TKE to demand at least a part of the authentication code AUK from the telecommunication device TKG (e.g., the code part which is specific to the telecommunication entity) the Tx/Rx element of the telecommunication entity TKE demands this part of the authentication code AUK from the telecommunication device TKG. In return, the Tx/Rx element of the telecommunication entity TKE receives the demanded part of the authentication code AUK from the telecommunication device TKG and passes the received authentication code AUK to the Ctrl element of the telecommunication entity TKE.

In an eighth subsequent state FZ8 following thereupon, the part or complete authentication code AUK that was transferred from the telecommunication device TKG is checked by the Ctrl element of the telecommunication entity TKE. If the check has a positive result (e.g., the transferred authentication code AUK is correct and matches, for example, an authentication code that is stored in the telecommunication entity TKE) the Ctrl element of the telecommunication entity TKE passes the demanded information INF, ARN, TAVI to the Tx/Rx element. The Tx/Rx element in turn transmits the demanded information INF, ARN, TAVI to the telecommunication device TKG. However, if the check has a negative result (e.g., the transferred authentication code AUK is incorrect and does not match, for example, an authentication code which is stored in the telecommunication entity TKE) the telecommunication connection TKV is terminated.

Following receipt of the demanded information INF, ARN, TAVI by the telecommunication device TKG, the transmitted information INF is output for the user. In reply to the received information INF, ARN, TAVI, a confirmation of receipt EBS is sent to the Tx/Rx element and Ctrl element of the telecommunication entity TICE. The output of the information INF, ARN, TAVI can be acoustic and/or visual. However, the output will preferably correspond to the form of the stored information INF, ARN, TAVI in the telecommunication entity TKE. If the stored information INF, ARN, TAVI is a caller message ARN or any audio information in general, for example, this will be output acoustically by means of playback, whereas if the information INF, ARN, TAVI is text or video information, it will preferably be output by visual means on a display of the telecommunication device TKG. After the information INF, ARN, TAVI has been output to the user, both the telecommunication device TKG and the telecommunication entity TKE go "ON HOOK" in a ninth subsequent state FZ9. In this way, the telecommunication connection TKV between the telecommunication device TKG and the telecommunication entity TKE is cleared down again.

Figure 5:
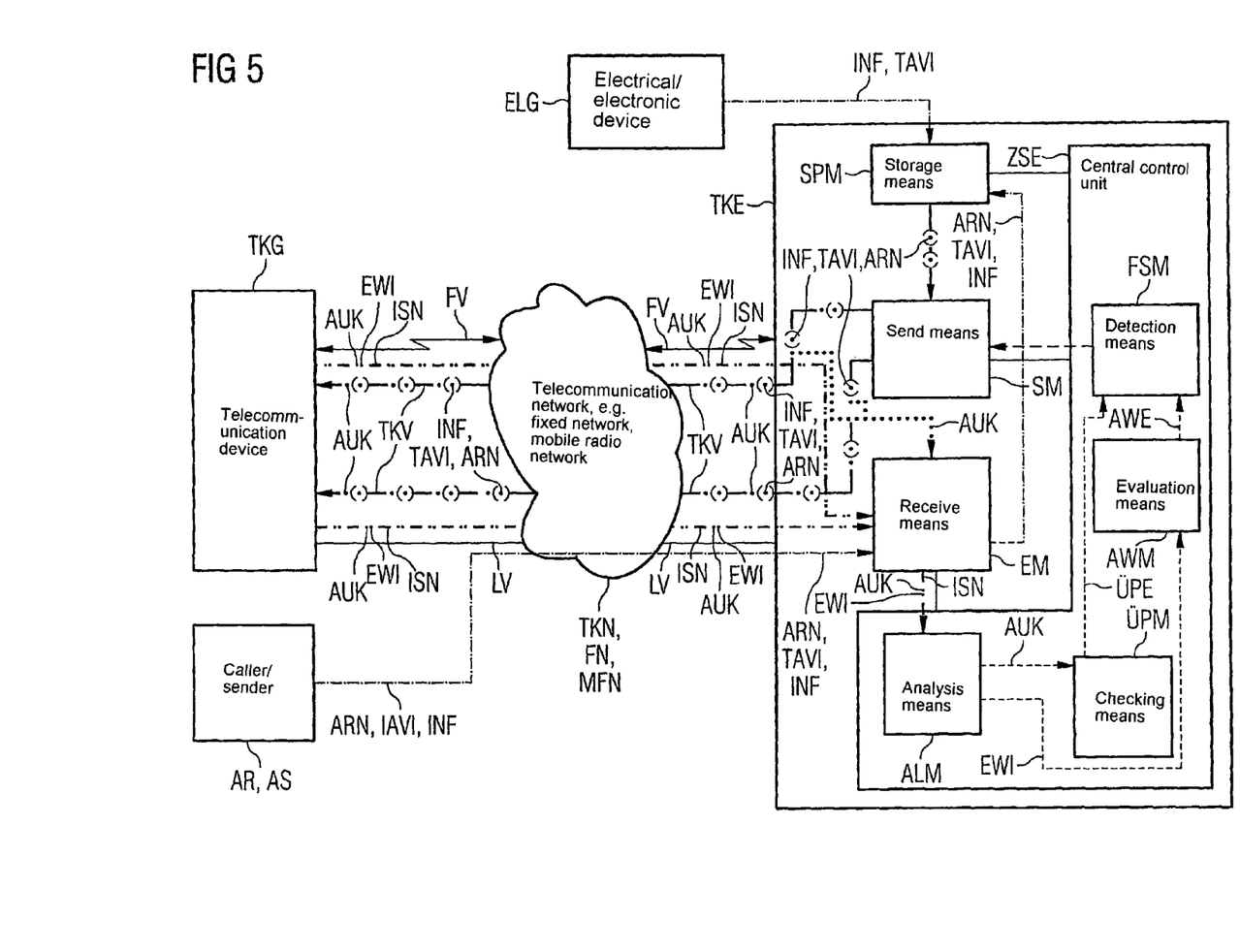
FIG. 5 illustrates the structure of the telecommunication entity in either FIGS. 3A and 3B or FIGS. 4A and 4B when the remote request takes place.

FIG. 5 illustrates in more detail the structure of the telecommunication entity TKE, which is relevant for the remote request of stored information, illustrated in FIGS. 3A, 3B, 4A and 4B. The telecommunication entity TKE includes, for example, a central control unit ZSE that is connected to send means SM and receive means EM. Furthermore, storage means SPM are assigned to the central control unit ZSE. The storage means can be arranged outside the central control unit ZSE and connected to it. Alternatively, however, it is also possible for the storage means SPM to be a component of the central control unit ZSE, i.e., integrated therein. In addition to the storage means SPM, which are assigned, the central control unit ZSE is also assigned detection means FSM, evaluation means AWM, checking means UPM and analysis means ALM, all of these preferably being integral components of the central control unit ZSE.

As seen in FIG. 5, the telecommunication entity TKE is connected to the telecommunication device TKG via a telecommunication network TKN, which can take the form of a fixed network FN or a mobile radio network MFN, as per the illustrations in FIGS. 3a and 3B, or FIGS. 4A and 4B. Concerning the telecommunication network TKN, which takes the form of a fixed network, there exists a line connection LV between the telecommunication entity TKE and the telecommunication device TKG. Concerning the telecommunication network TKN, which takes the form of a mobile radio network, there exists a radio connection FV between the telecommunication entity TKE and the telecommunication device TKG.

Before a remote request of stored information is even possible, this remotely requested information must first arrive in the telecommunication entity TKE. Representing the multiplicity of possibilities whereby such information could arrive in the telecommunication entity TKE, three of these possibilities are presented. Firstly, it is possible that the telecommunication entity TKE or the associated telecommunication subscriber is called by a caller (external telecommunication subscriber) AR via the telecommunication network TKN. The caller leaves a caller message ARN because the called party does not accept the call. The caller message can be stored in the storage means SPM. Secondly, it is possible that the telecommunication entity TKE or the associated telecommunication subscriber receives service messages (e.g., an SMS message (Short Message Service) or an MMS message (Multimedia Message Service)) from a sender AS via the telecommunication network TKN. The service messages can be stored in the form of text, audio and/or video information TAVI in the storage means SPM of the telecommunication entity TICE.

Thirdly, it is possible that an electrical/electronic device ELG is assigned to the telecommunication entity TKE, wherein said electrical/electronic device ELG transmits data about its operating state to the telecommunication entity TKE and this data is likewise stored in the form of text, audio and/or video information TAVI in the storage means SPM of the telecommunication entity TKE. The storage operation corresponding to the cited possibilities is indicated in each case by means of dash-dot line arrow illustrations in FIG. 5.

FIG. 5 also illustrates how the information INF, EWI, TAVI, codes AUK and messages ISN, ARN (e.g., which were transmitted between the telecommunication entity TKE and the telecommunication device TKG via the telecommunication connection TKV as per the remote request scenarios in FIGS. 3A, 3B, 4A and 4B) are processed by the central control unit ZSE and the assigned means SPM, SM, EM, FSM, AWM, UPM, ALM. FIG. 5 also illustrates how the central control unit ZSE and the assigned means SPM, SM, EM, FSM, AWM, UPM, ALM interact in this regard, thereby forming a functional unit. FIG. 5 also illustrates how the central control unit ZSE and the assigned means SPM, SM, EM, FSM, AWM, ÜPM, ALM finally transmit the stored information INF, ARN, TAVI. The stored information INF, ARN, TAVI can be demanded by the telecommunication device TKG to the telecommunication device TKG, depending on an evaluation result AWE and a check result ÜPE (cf. subsequent states FZ8 and FZ10 in FIG. 3B and subsequent states FZ6 and FZ8 in FIG. 4B).

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for the remote request of information stored in a telecommunication entity, wherein an initialization message that initiates a remote request is sent to the telecommunication entity, the method comprising, via the initialization message, notifying the telecommunication entity of: an authentication code that authorizes the remote request, and dial-in information that is to be used as a transfer address for transferring stored information; in the telecommunication entity, determining and checking the authentication code, determining and evaluating the dial-in information, and in the case of a positive check result of the authentication code, and a positive evaluation of the dial-in information, establishing a telecommunication connection to a telecommunication device that corresponds to the dial-in information; and using the telecommunication connection, transferring the stored information to a remote requester, wherein an individual code, which is distinguishable from a telephone number, is used as the authentication code, wherein the individual code includes a code part that is specific to the telecommunication entity, and wherein the code part, which is specific to the telecommunication entity, is transmitted from the telecommunication device via the established telecommunication connection before the information is transferred by the telecommunication entity.

2. The method of claim 1, wherein the initialization message comprises a telephone message.

3. The method of claim 1, wherein the initialization message comprises a short message.

4. The method of claim 1, wherein the initialization message comprises a multimedia message.

5. The method of claim 1, wherein the dial-in information is inherently included in the initialization method, and the dial-in information is transferred directly with the initialization message.

6. The method of claim 1, wherein the dial-in information is transferred indirectly, as Calling Line Identification Presentation information, with the initialization message.

7. The method of claim 1, further comprising remotely requesting a caller message from a caller.

8. The method of claim 1, further comprising remotely requesting text, audio and/or video information.

9. The method of claim 8, wherein the text, audio and/or video information contains data relating to an operating state of an electrical/electronic device assigned to the telecommunication entity.

10. A telecommunication entity having remote request functionality for stored information, the telecommunication entity comprising: a central control unit for controlling functional sequences and operating sequences in the telecommunication entity; send means connected to the central control unit; and receive means connected to the central control unit, the receive means and the central control unit being configured to cause the telecommunication entity to receive an initialization message that initiates a remote request; an analysis means assigned to the central control unit; a checking means assigned to the central control unit; an evaluation means assigned to the central control unit; a detection means assigned to the central control unit; and storage means for storing information, the storage means being assigned to the central control unit, wherein the central control unit, the analysis means, and the receive means are configured to cause the initialization message received by the telecommunication entity to be analyzed with reference to an authentication code for authorizing a remote request and dial-in information that serves as a transfer address for transferring stored information; wherein the central control unit, the analysis means, and the checking means are configured to cause an authentication code, which is determined as a result of analysis of an initialization message, to be checked; wherein the central control unit, the analysis means, and the evaluation means are configured to cause evaluation of dial-in information, the dial-in information having been determined as a result of analysis of an initialization message; wherein the central control unit, the detection means, the checking means, the evaluation means, and the send means are configured to respond to a positive check result of an authentication code and a positive evaluation result of dial-in information by establishing a telecommunication connection to a telecommunication device that corresponds to the dial-in information; wherein the central control unit, the storage means, and the send means are configured to cause transfer of information to a remote requestor via an established telecommunication connection, and wherein the central control unit, the storage means, and the send means are further configured to cause information to be transferred as soon as the code part, which is specific to the telecommunication entity, has been transmitted from the telecommunication device via the established telecommunication connection.

11. The telecommunication entity of 10, wherein the initialization message comprises a telephone message.

12. The telecommunication entity of claim 10, wherein the initialization message comprises a short message or a multimedia message.

13. The telecommunication entity of claim 10, wherein the initialization message is a multimedia message.

14. The telecommunication entity of claim 10, wherein the authentication code comprises an individual code that is distinguishable from a telephone number.

15. The telecommunication entity of claim 14, wherein the individual code includes a code part that is specific to the telecommunication entity.

16. The telecommunication entity of claim 10, wherein the initialization message inherently includes dial-in information, and wherein the dial-in information can be transferred directly with the initialization message.

17. The telecommunication entity of claim 10, wherein the dial-in information can be transferred indirectly as Calling Line Identification Presentation information with the initialization message.

18. The telecommunication entity of claim 10, wherein the stored information contains a caller message from a caller.

19. The telecommunication entity of claim 10, wherein the stored information contains text, audio and/or video information.

20. The telecommunication entity of claim 19, wherein the text, audio and/or video information comprises data that provides information relating to an operating state of an electrical/electronic device that is assigned to the telecommunication entity.

21. The method of claim 1, wherein the initialization message comprises a service message.

22. The telecommunication entity of 10, wherein the initialization message comprises a telephone message.

* * * * *